United States Patent
Zhang et al.

(10) Patent No.: US 11,423,194 B2
(45) Date of Patent: Aug. 23, 2022

(54) BUILDING AUTOMATION SYSTEM VISUALIZATIONS FROM ONTOLOGY

(71) Applicant: HONEYWELL INTERNATIONAL INC., Morris Plains, NJ (US)

(72) Inventors: Weilin Zhang, Morris Plains, NJ (US); Yi Sun, Morris Plains, NJ (US); Conrad B. Beaulieu, Morris Plains, NJ (US); Ben Coleman, Morris Plains, NJ (US); Henry Chen, Morris Plains, NJ (US)

(73) Assignee: Honeywell International Inc., Charlotte, NC (US)

( * ) Notice: Subject to any disclaimer, the term of this patent is extended or adjusted under 35 U.S.C. 154(b) by 382 days.

(21) Appl. No.: 16/494,166

(22) PCT Filed: Mar. 16, 2017

(86) PCT No.: PCT/CN2017/076900
§ 371 (c)(1),
(2) Date: Sep. 13, 2019

(87) PCT Pub. No.: WO2018/165938
PCT Pub. Date: Sep. 20, 2018

(65) Prior Publication Data
US 2020/0082037 A1    Mar. 12, 2020

(51) Int. Cl.
*G06F 30/18* (2020.01)
*G06F 30/33* (2020.01)
*G05B 15/02* (2006.01)

(52) U.S. Cl.
CPC .............. *G06F 30/18* (2020.01); *G06F 30/33* (2020.01); *G05B 15/02* (2013.01)

(58) Field of Classification Search
CPC .......... G06F 30/33; G06F 30/18; G05B 15/02
See application file for complete search history.

(56) References Cited

U.S. PATENT DOCUMENTS 7,558,712 B1 * 7/2009 Aldrich .................. G06F 30/30
703/2
8,682,921 B2 3/2014 Park et al.
(Continued)

OTHER PUBLICATIONS

Extended European Search Report for related EP Application 17901069.9, dated Oct. 30, 2020 (12 pgs).
(Continued)

*Primary Examiner* — Kibrom K Gebresilassie
(74) *Attorney, Agent, or Firm* — Brooks, Cameron & Huebsch, PLLC

(57) ABSTRACT

Methods, devices, and systems for building automation system visualization from ontology are described herein. One device includes a display, a processing resource, and a memory having instructions stored thereon which, when executed by the processing resource, cause the processing resource to determine a respective model associated with each of a plurality of devices of a Building Automation System (BAS), wherein each respective model includes an input handler and an output handler associated with its respective device, display, via the display, a visualization of the plurality of models and connections between the plurality of models, wherein the visualization is created from a template having a particular ontology corresponding to the BAS, receive operating information associated with the BAS from at least one of the plurality of devices, and modify the visualization based on the received operating information.

18 Claims, 9 Drawing Sheets

(56) References Cited

U.S. PATENT DOCUMENTS

| | | | | |
|---|---|---|---|---|
| 9,811,249 B2* | 11/2017 | Chen | ................... | G06Q 10/06 |
| 10,181,059 B1* | 1/2019 | Brewton | ................... | G06F 8/20 |
| 10,719,645 B1* | 7/2020 | Zhang | ................ | G06F 11/3608 |
| 2005/0289467 A1 | 12/2005 | Imhof et al. | | |
| 2008/0022259 A1* | 1/2008 | MacKlem | ................ | G06F 8/34 |
| | | | | 717/113 |
| 2009/0299790 A1* | 12/2009 | Devarajan | ............. | G06Q 50/30 |
| | | | | 703/1 |
| 2009/0302626 A1* | 12/2009 | Dollar | ................ | B25J 15/12 |
| | | | | 294/106 |
| 2012/0011126 A1* | 1/2012 | Park | ...................... | G06F 9/541 |
| | | | | 707/741 |
| 2012/0011141 A1* | 1/2012 | Park | ................. | G06F 16/24522 |
| | | | | 707/769 |
| 2014/0277660 A1* | 9/2014 | Nelaturi | ................ | B23Q 3/103 |
| | | | | 700/97 |
| 2014/0278272 A1* | 9/2014 | Nelaturi | ................ | G06F 30/00 |
| | | | | 703/1 |
| 2016/0011753 A1* | 1/2016 | McFarland | ......... | G06F 3/04847 |
| | | | | 715/771 |
| 2016/0224645 A1 | 8/2016 | Dang | | |
| 2017/0038945 A1 | 2/2017 | Beaulieu et al. | | |
| 2018/0088789 A1* | 3/2018 | Han | ..................... | G06F 3/0482 |
| 2018/0357801 A1* | 12/2018 | Rasheed | ................ | G06T 11/60 |

OTHER PUBLICATIONS

Han, et al., "Semantic Context-Aware Service Composition for Building Automation System"; IEEE Transactions on Industrial Informatics, vol. 10, No. 1 (Feb. 2014) (10 pgs).

Caffarel, et al., "Implementation of a Building Automation System Based on Semantic Modeling"; Journal of Universal Computer Science, vol. 19, No. 17 (Nov. 2013) (16 pgs).

Dibowski, et al., "Ontology-Based Device Descriptions and Device Repository for Building Automation Devices" Research Gate—EURASIP Journal on Embedded Systems, vol. 2011, (Sep. 28, 2010) (19 pgs).

\* cited by examiner

BUILDING AUTOMATION SYSTEM VISUALIZATIONS FROM ONTOLOGY

TECHNICAL FIELD

The present disclosure relates to methods, devices, and systems for building automation system visualization from ontology.

BACKGROUND

At a facility, users may use one or more visualizations to install, maintain, and/or monitor facility systems and/or devices. Visualizations can include diagrams such as line, branching, and/or schematic diagrams, for instance, among other types of visualizations.

Previous approaches to generating schematic visualizations may fall short due to the intricacies involved in schematic visualizations. Moreover, previous approaches may lack a unified model. Some previous approaches, for instance, may utilize a static picture to present devices and/or relationships between devices. In such approaches, a visualization may be created individually by a user having knowledge of the building automation system (BAS) to be depicted in the visualization. That is, one or more users may create and/or modify a visualization using a computerized drawing tool (e.g., diagramming software). Such approaches may be time-consuming, especially so in cases where the desired visualization is complex. In addition, previous approaches become obsolete in the face of change(s) such as when, for example, a device is installed or removed from the facility.

DETAILED DESCRIPTION

Figure 1:
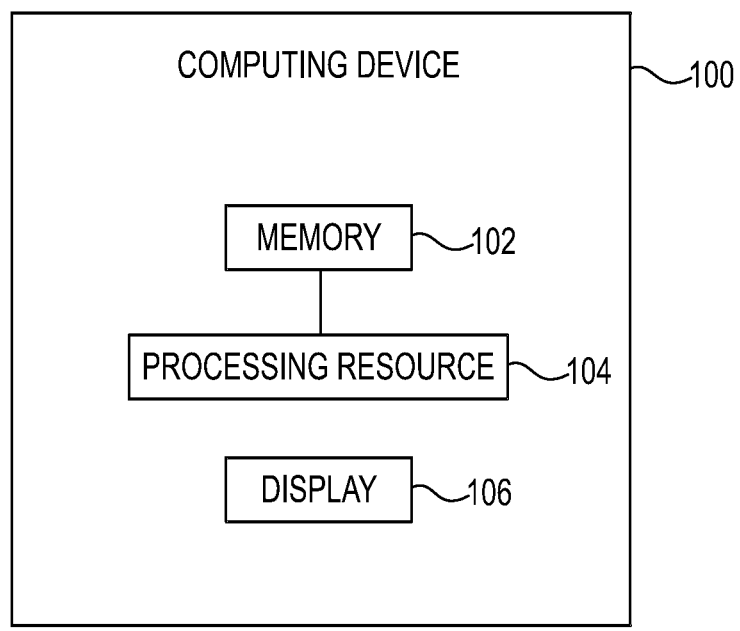
FIG. 1 illustrates a computing device for building automation system visualizations from ontology in accordance with one or more embodiments of the present disclosure.

Devices, methods, and systems for BAS visualization from ontology are described herein. For example, one or more embodiments include a display, a processing resource, and a memory having instructions stored thereon which, when executed by the processing resource, cause the processing resource to determine a respective model associated with each of a plurality of devices of a Building Automation System (BAS), wherein each respective model includes an input handler and an output handler associated with its respective device, display, via the display, a visualization of the plurality of models and connections between the plurality of models, wherein the visualization is created from a template having a particular ontology corresponding to the BAS, receive operating information associated with the BAS from at least one of the plurality of devices, and modify the visualization based on the received operating information.

Visualizations in accordance with one or more embodiments of the present disclosure can be created (e.g., created, edited, modified, etc.) using an interface that allows the display and/or editing of visualizations. These visualizations can be created with much less user input than previous approaches. The increased automation afforded by embodiments of the present disclosure can yield savings in time and monetary cost.

Further, visualizations in accordance with the present disclosure can be updated (e.g., in real time) to reflect current conditions in a BAS and/or to mirror changes in the device(s) and/or system(s) represented in the visualization. For example, in some embodiments, real-time values can be included in a visualization. In another example, the addition of an air handling unit (AHU) device to an HVAC system represented by a visualization can be represented in the visualization without a user needing to redraw the visualization (as in previous approaches).

Additionally, embodiments herein can utilize vector diagrams rather than the static diagrams used in previous approaches. Vector diagrams may exhibit advantages such as the ability to be supported in a wide range of platforms (e.g., HTML5, Android, Apple IOS, etc.).

In accordance with embodiments of the present disclosure, schematic visualizations can be created without user input (e.g., automatically) from one or more templates (e.g., models). In some embodiments, templates can be associated with concepts and/or objects (e.g., AHUs, valves, floors, rooms, etc.) in a BAS as the rdfs:Class with properties defined by rdf:property, for instance. In some embodiments, templates can be associated with devices and/or equipment (e.g., AHUs, pumps, chillers, fans, boilers, variable air volume (VAV) devices, fan coil units (FCUs), cooling towers, etc.).

Devices of a BAS can include at least one input handler and at least one output handler. Embodiments herein can define geometric qualities associated with these components in addition to the connection(s) between input handler and output handlers (and vice versa).

An "ontology," as referred to herein, can be a naming, description, and/or definition of the types, properties, and/or interrelationships of the instances of a BAS. An instance of a BAS (herein referred to as "instance") is a component (e.g., subset) of a BAS. For example, instances can include devices, machines, connections, parameters, entities, and/or combinations of BAS components. In an example, instances in a heating, ventilation, and air conditioning (HVAC) system can include dampers, chillers, cooling towers, pumps, valves, AHUs, fans, etc.

Visualizations in accordance with the present disclosure can be created using one or more visualization templates. A template can include instructions executable to dictate the manner in which a BAS is to be visualized (e.g., displayed, shown, depicted, etc.) in accordance with the ontology of the BAS.

As referred to herein, a BAS can include a heating, ventilation, and air conditioning system, a lighting system, an access control system, a water supply system, an energy system, a security system, a visual security system, a facility management system, a people tracking system, a building maintenance system; a data analytics system, and a building control system. In some embodiments, models can include models respectively associated with different BASs (or BAS types), which may be referred to as "reference models." In some embodiments, models can include models respectively associated with instances of one or more BASs, which may be referred to as "instance models." Models can be mapped to devices and/or device types they support for visualization. Additionally, models for each device type may also be associated with the kind of visualization and/or style they represent. For instance, visualizations can include 1-line, HVAC system, equipment schematic, equipment bill of materials (BOM), floor plan, etc. Such association may allow embodiments herein to create visualizations more effectively and/or with reduced user input compared to previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

FIG. 1 illustrates a computing device 100 for BAS visualizations from ontology in accordance with one or more embodiments of the present disclosure. Computing device 100 can be, for example, a laptop computer, a desktop computer, or a mobile device (e.g., a mobile phone, a personal digital assistant, etc.), among other types of computing devices.

As shown in FIG. 1, computing device 100 includes a memory 102 and a processing resource (e.g., processor) 104 coupled to memory 102. Memory 102 can be any type of storage medium that can be accessed by processing resource 104 to perform various examples of the present disclosure. For example, memory 102 can be a non-transitory computer readable medium having computer readable instructions (e.g., computer program instructions) stored thereon that are executable by processing resource 104 to create BAS visualization from ontology in accordance with one or more embodiments of the present disclosure.

Memory 102 can be volatile or nonvolatile memory. Memory 102 can also be removable (e.g., portable) memory, or non-removable (e.g., internal) memory. For example, memory 102 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 102 is illustrated as being located in computing device 100, embodiments of the present disclosure are not so limited. For example, memory 102 can also be located internal to another computing resource (e.g., enabling computer readable instructions to be downloaded over the Internet or another wired or wireless connection).

As shown in FIG. 1, computing device 100 can also include a display 106. The display 106 can include a screen, for instance. The display 106 can be, for instance, a touch-screen (e.g., the display 106 can include touch-screen capabilities). The display 106 can provide (e.g., display and/or present) information to a user of the computing device 100. For example, the display 106 can display the visualization depicted in FIG. 2, for instance.

The display 106 can display aspects of a browser and/or application executed by the computing device 100, for instance. The computing device 100 can communicate with and/or receive information from various sources, for instance. The computing device can receive information from an instance source, a real-time values source, a template source, and/or an ontology source. One or more of these information sources can be a database and/or an application program interface (API), for instance, though embodiments of the present disclosure are not so limited. In some embodiments, one or more of the information sources can be a BAS device (e.g., a chiller). In some embodiments, one or more of the sources can be a computing device and/or a controller associated with a BAS device.

The ontology source can include one or more ontologies that define how to describe one or more domains (e.g., BAS). An ontology can be a naming, description, and/or definition of the types, properties, and/or interrelationships of the valid instances of a domain.

The template source can store and/or provide templates used to create visualizations. The template source can include a plurality of templates. In some embodiments, each of the plurality of templates can be associated with a particular device. In some embodiments, a template can be associated with a plurality of devices. A template can dictate how a group of connected devices is to be visualized in accordance with the ontology of the BAS. A template can be considered to be an encoding of the visualization rules defined by an ontology.

A template can include a plurality of symbols (e.g., a symbol library) that are relevant to a particular BAS. For example, a template associated with an HVAC system may contain standardized symbols that represent common devices in an HVAC system (e.g., fans, ducts, etc.).

The instance source can contain information associated with BAS instances, which may be referred to as "instance information." As previously discussed, instances are components of a BAS. For example, instances can include devices, machines, connections, parameters, entities, and/or combinations of BAS components. In an example, instances in an HVAC system can include dampers, chillers, cooling towers, pumps, wiring, piping, sensors, actuators, valves, AHUs, fans, etc. Instance information can include configuration information. Instance information can include information describing a particular device, how the device operates, how the device is connected to other devices, how the device interacts with other devices, configuration information associated with the device, a functional profile of the device, settings (e.g., communications settings) of the device, device interface definitions or reference, version number(s) of the device, device timing, etc.

The real-time values source can contain information associated with the actual operation of specific instances. In some embodiments, the real-time values source can be (or include) a BAS device capable of communicating its operating information to the interface. In some embodiments, the real-time values source can be (or include) a controller and/or computing device associated with (e.g., controlling operation of) a BAS device capable of communicating operating information of the BAS device to the interface.

Operating information, as referred to herein, includes real-time information describing one or more aspects of the operation of a BAS device. Information that constitutes operating information may depend on the particular type of facility device. For example, operating information can include temperature, speed (e.g., fan speed), status (e.g., on, off, open, closed, etc.), set point, condition (e.g., normal, abnormal, etc.), pressure, voltage, and/or flow rate, among others.

The computing device 100 can determine a respective model associated with each of a plurality of devices of a BAS, wherein each respective model includes an input handler and an output handler associated with its respective device. Input handlers and output handlers are discussed further below. The computing device 100 can display, via the display 106, a visualization of the plurality of models and connections between the plurality of models. In some embodiments, the visualization can be created from a template having a particular ontology corresponding to the BAS. The computing device 100 can receive operating information associated with the BAS from at least one of the plurality of devices, and modify the visualization based on the received operating information.

Figure 2:
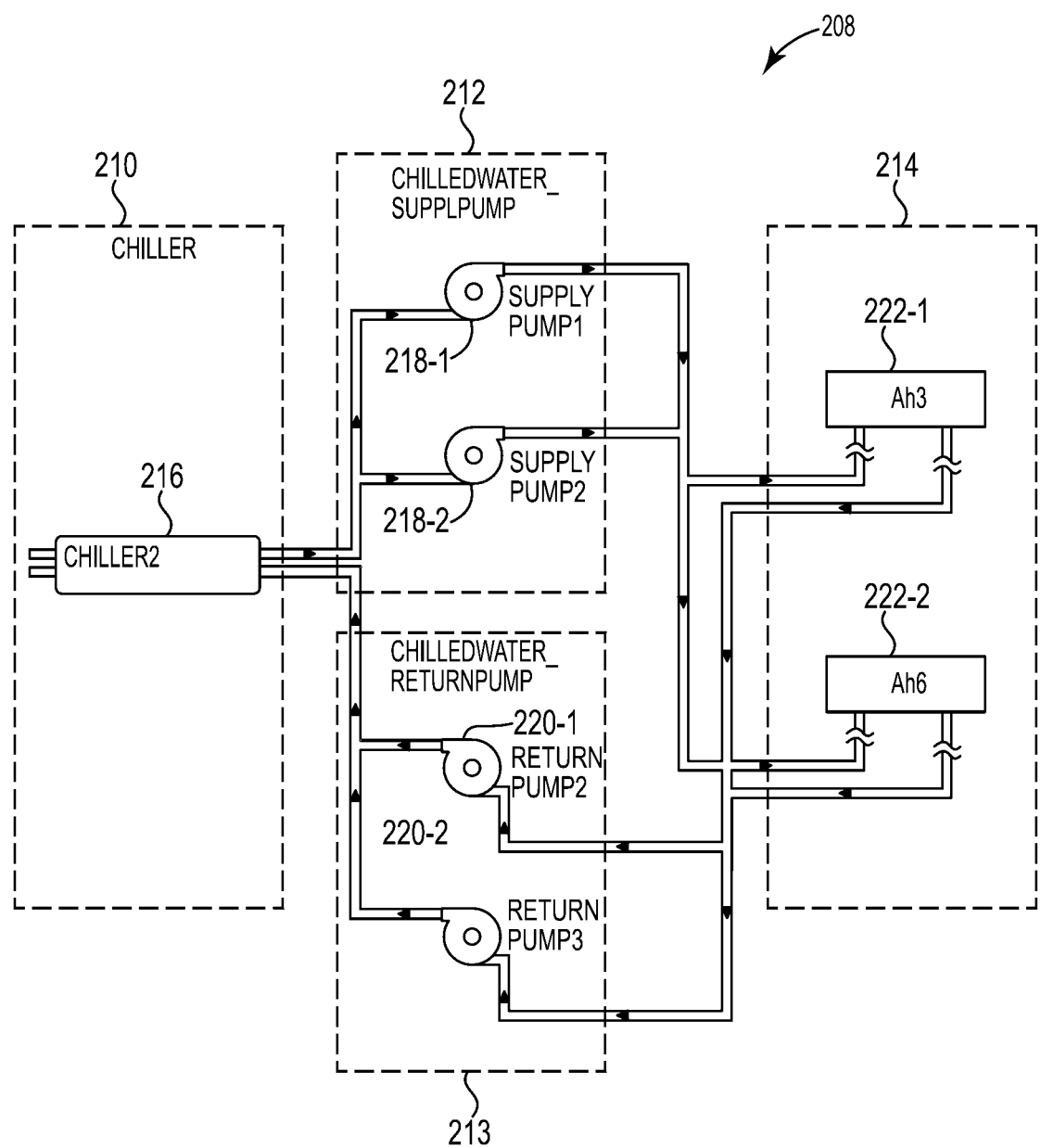
FIG. 2 illustrates an example schematic visualization in accordance with one or more embodiments of the present disclosure.

FIG. 2 illustrates an example schematic visualization in accordance with one or more embodiments of the present disclosure. The visualization 208 can be displayed, for example, on the display 106 of computing device 100 described in connection with FIG. 1. As shown in FIG. 2, the visualization 208 includes a plurality of devices grouped together by bounding boxes. For example, a chiller 216 is bounded by a chiller bounding box 210. A supply pump 218-1 and a supply pump 218-2 are bounded by a supply pump bounding box 212. An AHU 222-1 and an AHU 222-2 are bounded by an AHU bounding box 214. A return pump 220-1 and a return pump 220-2 are bounded by a bounding box 213. It is noted that the numbers and/or types of components included in the bounding boxes, as well as the number and/or types of bounding boxes themselves, are not intended to be limited herein.

As shown in FIG. 2, relationships between devices can be shown by lines connecting the devices. In some embodiments, the lines can connect an input handler or output handler of a first device (e.g., the chiller 216) to the input handler or output handler of a second device (e.g., the supply pump 218-1). The generation of a schematic visualization, such as that illustrated in FIG. 2, is discussed below.

Figure 3:
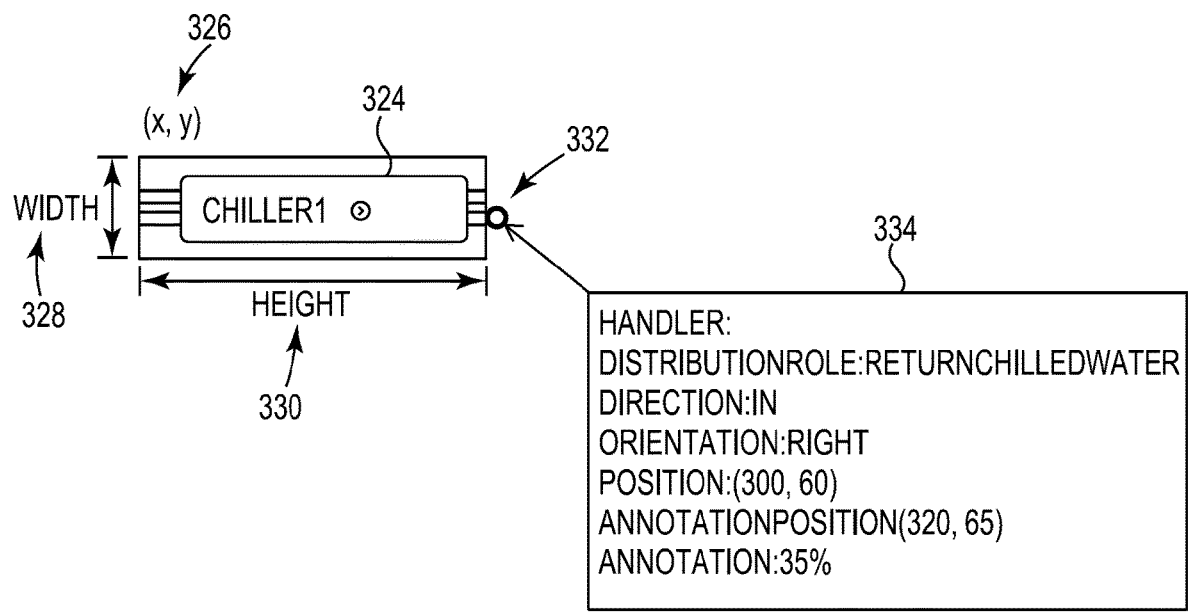
FIG. 3 illustrates a model of a device in accordance with one or more embodiments of the present disclosure.

FIG. 3 illustrates a model of a device in accordance with one or more embodiments of the present disclosure. The example device illustrated in FIG. 3 is a chiller 324 named "Chiller1." It is noted that while the example of a chiller is discussed in FIG. 3 for the purposes of discussion, embodiments of the present disclosure are not so limited.

As shown in FIG. 3, a plurality of properties associated with the chiller 324 can be determined and/or defined. In some embodiments, properties can be retrieved from the ontology. In some embodiments, properties can be defined and/or initialized from configuration information associated with the chiller 324. In the present disclosure, reference to "device," "model" or "template" may refer to a displayed model of one or more devices in a visualization.

Properties can include a position 326 of the chiller 324 in the visualization. The position 326 can include a horizontal and/or vertical position in the visualization. Properties can include a width 328 and/or a height 330 of the chiller 324 in the visualization. Properties can include properties associated with a handler of the chiller 324. For instance, a details window 334 can be provided that includes detailed properties associated with the handler. In the example illustrated in FIG. 3, the handler 332 has a role of returning chilled water, is an input handler (e.g., as opposed an output handler), has a rightward orientation (e.g., as opposed to up, down, or left), has a defined position, a defined annotation, and a defined annotation position. A value of the annotation, for instance, can be retrieved from the BAS to which the chiller 324 belongs according to its role defined by the ontology.

Figure 4:
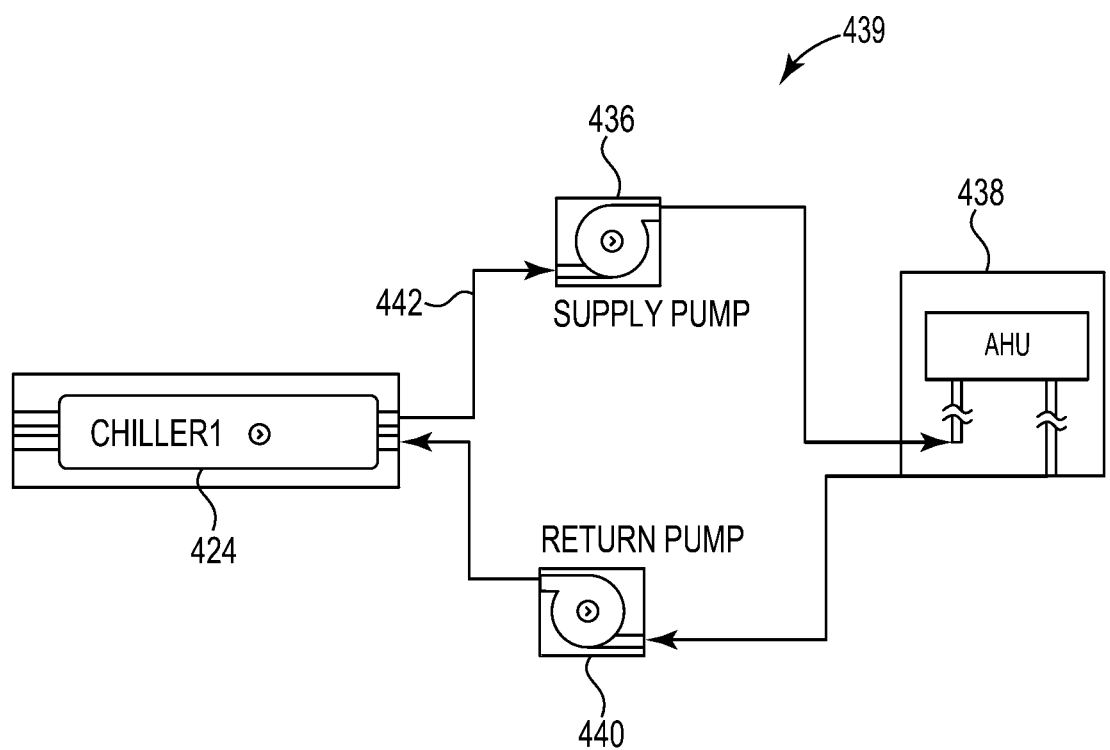
FIG. 4 illustrates a subset of a building automation system in accordance with one or more embodiments of the present disclosure.

FIG. 4 illustrates a subset 439 of a BAS in accordance with one or more embodiments of the present disclosure. The subset 439 illustrated in FIG. 4 can represent a portion of a BAS and may be used to inform discussion below in connection with FIGS. 5-9.

As shown in FIG. 4, the example subset 439 includes a chiller 424, a supply pump 436, an AHU 438, and a return pump 440. One or more of the devices of the subset 439 may be connected by a line 442 illustrating a relationship between those devices. The relationship between the devices may correlate to the flow of fluid between the devices. For instance, water may flow from the chiller 424 to the supply pump 436, then to the AHU 438, and back to the chiller 424 via the return pump 440. The relationships between the component devices shown in FIG. 4 can be retrieved from ontology and can be associated with input and/or output handlers of the component devices. It is noted that while a single device is illustrated for each of the components of FIG. 4, embodiments of the present disclosure are not so limited. For example, supply pump 436 may refer to a single supply pump or to multiple supply pumps.

Figure 5:
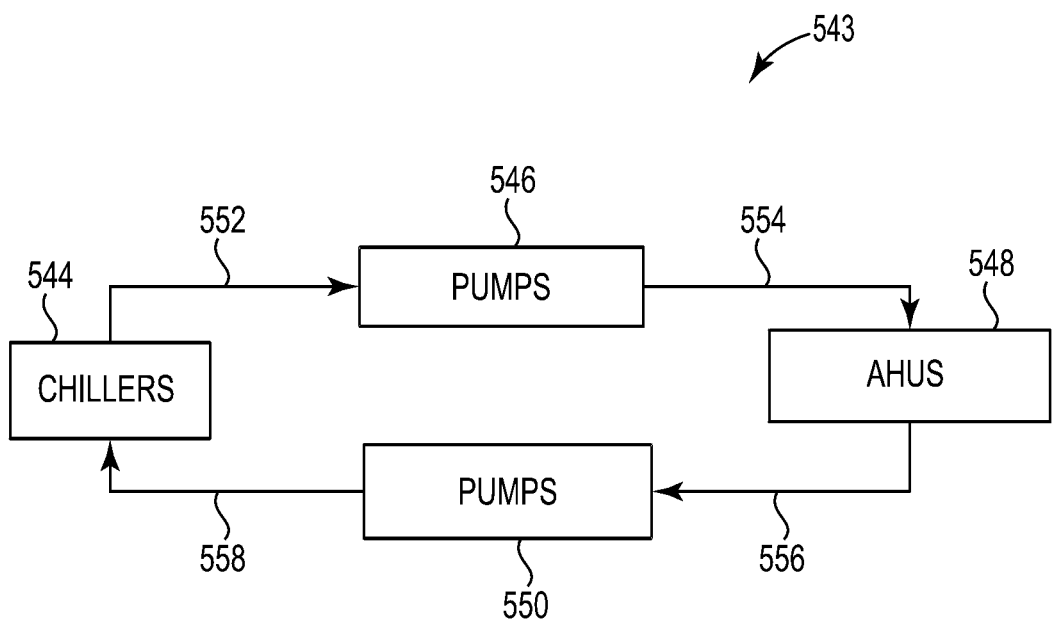
FIG. 5 illustrates a template associated with a portion of a building automation system in accordance with one or more embodiments of the present disclosure.

FIG. 5 illustrates a template 543 associated with a portion of a BAS in accordance with one or more embodiments of the present disclosure. The template 543 illustrated in FIG. 5 may be entitled "chilledwater_tpl," for instance, though such usage is not intended to be limiting. Rectangles in the template 543 can represent devices and/or collections (e.g., groups) of similar devices. Lines can represent relationships between those devices and/or collections. For instance, the template 543 includes chillers 544, a first collection of pumps (e.g., supply pumps) 546, AHUs 548, and a second collection of pumps (e.g., return pumps) 550.

The layout of the template 543 illustrated in FIG. 5 can be described using xml, for instance, as:

```
<Layout Type="chilledwater-layout">
    <DeviceGroup DeviceType="chiller" Position="350 100 250 500"></DeviceGroup>
    <DeviceGroup DeviceType="chilledwater_supplypump" Position="650 50 250 320"></DeviceGroup>
```

-continued

```
        <DeviceGroup DeviceType="chilledwater_returnpump"
Position="650 400 250 320"></DeviceGroup>
        <DeviceGroup DeviceType="ahu" Position="1050 100 250
500"></DeviceGroup>
        <Relations>
            <Relation From="chiller"
to="chilledwater_supplypump"></Relation>
            <Relation From="chilledwater_supplypump"
to="ahu"></Relation>
            <Relation From="ahu"
to="chilledwater_returnpump"></Relation>
            <Relation From="chilledwater_returnpump"
to="chiller"></Relation>
        </Relations>
    </Layout>
```

Particular instances can be determined according to the template 543. Instances of pumps, AHUs, and/or chillers can be retrieved from an ontology associated with the BAS to which those devices belong. The relationships between those devices can also be retrieved from the ontology. For instance a query (e.g., a SPARQL query) for the relationship between the chillers 544 and the pumps 546 can be expressed as:

```
    SELECT ?chiller ?fromProduct ?relation ?toProduct ?fromProduct
Type ?toProductType ?fromProductLabel ?toProductLabel
        WHERE {
            ?chiller ^hbscore:suppliesFromProduct ?relation.
            ?relation hbscore:suppliesToProduct ?toProduct.
            ?relation
hbscore:suppliesFromProduct ?fromProduct.
            ?fromProduct rdf:type ?fromProductType.
            ?toProduct rdf:type ?toProductType.
            ?fromProduct rdf:type hbshvac:Chiller. ?toProduct
rdf:type hbshvac:Pump
            BIND ("chiller" AS ?fromProductLabel).
            BIND ("chilledWater_supplyPump"
AS ?toProductLabel).
        }
```

A query for the relationship between the pumps 546 and the AHUs 548 can be expressed as:

```
    SELECT ?chiller ?fromProduct ?relation ?toProduct ?fromProduct
Type ?toProductType ?fromProductLabel ?toProductLabel
        WHERE {
            ?chiller ^hbscore:suppliesFromProduct /
hbscore:suppliesToProduct / ^hbscore:suppliesFromProduct ?relation.
            ?relation hbscore:suppliesToProduct ?toProduct.
            ?relation
hbscore:suppliesFromProduct ?fromProduct.
            ?fromProduct rdf:type ?fromProductType.
            ?toProduct rdf:type ?toProductType.
            ?fromProduct rdf:type hbshvac:Pump.?toProduct
rdf:type hbshvac:AirHandlingUnit
            BIND ("chilledWater_supplyPump"
AS ?fromProductLabel).
            BIND ("ahu" AS ?toProductLabel).
        }
```

Embodiments of the present disclosure can determine a layout of the devices and relationships in the visualization. For instance, a layout boundary can respectively be determined for different devices and/or device types. A respective boundary can be created for chillers, return pumps, supply pumps, AHUs, boilers, cooling towers, and/or other devices.

Devices can be displayed in the visualization by determining a start position of the devices according to the layout boundaries and boundaries of the devices themselves, setting a start position for each device, and "drawing" the devices on the display according to the device object(s). Relationships can be displayed in the visualization by categorizing the relationships into groups according to source and destination device and "drawing" a path for each relationship according to that relationship group. In some embodiments, determining the path can include determining a central point (e.g., control point) for each group, determining a path through the central point according to the source device and the destination device, and connecting the devices with one or more lines in the visualization.

Figure 6:
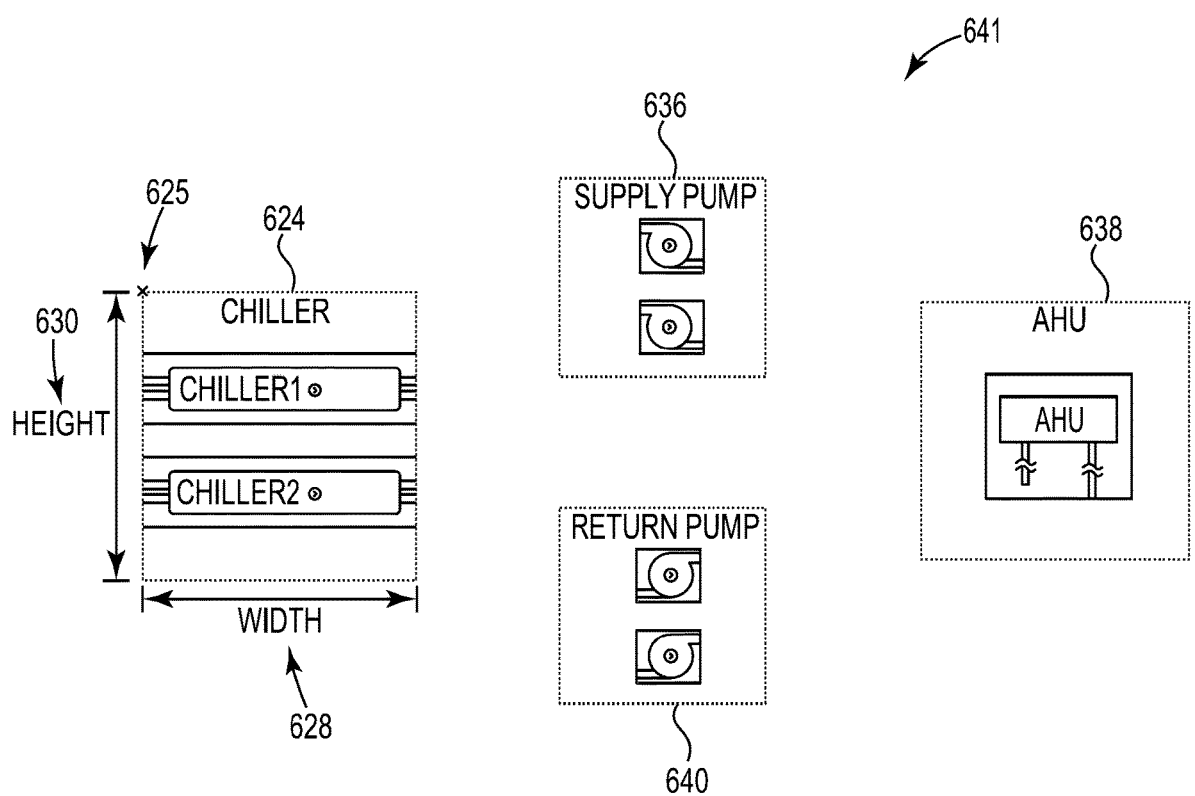
FIG. 6 illustrates devices displayed in a visualization in accordance with one or more embodiments of the present disclosure.

FIG. 6 illustrates devices displayed in a visualization in accordance with one or more embodiments of the present disclosure. The visualization 641 can be displayed, for example, on the display 106 of computing device 100 described in connection with FIG. 1. As shown in FIG. 6, the visualization 641 includes a chiller 624, a supply pump 636, an AHU 638, and a return pump 640. For each device, a start position, a height, and a width can be determined. For example, a start position 625, a width 628, and a height 630 can be determined for the chiller 624. The start position 625 can be defined in configuration information associated with the chiller 624, for instance. The width 628 and/or height 630 can be determined based on the boundary of the chiller 624 and/or the number of devices within the box defined as "chiller 624." For instance, as shown in FIG. 6, the chiller 624 includes two chillers: chiller1 and chiller2; it is to be understood that the height and/or width of the chiller 624 may differ if the chiller 624 included a different number of chillers therein.

It is to be understood that while start positions, groupings, widths, heights, connections, control points and/or other parameters associated with templates can be determined by the computing device, as discussed. In some embodiments, such parameters can be manually created and/or modified. For instance, a user can reposition groupings, equipment, relational connections between equipment, control points, inflection points, etc. In some embodiments user modifications can override computer determinations performed to generate one or more visualizations.

Figure 7:
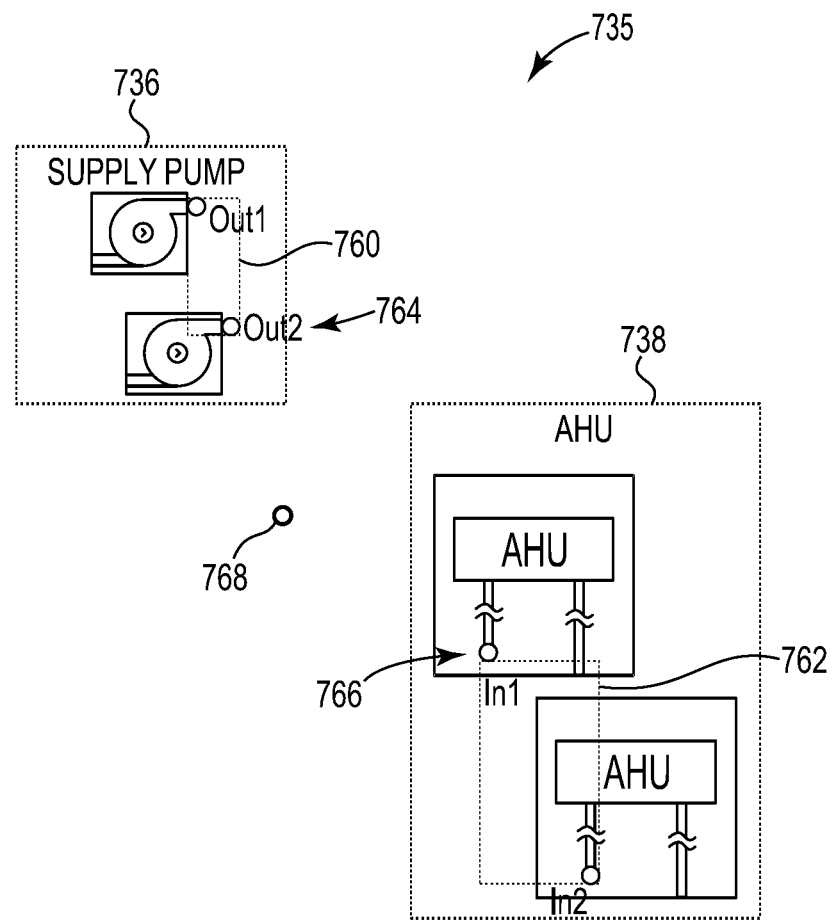
FIG. 7 illustrates a visualization associated with determining a control point in accordance with one or more embodiments of the present disclosure.

FIG. 7 illustrates a visualization 735 associated with determining a control point in accordance with one or more embodiments of the present disclosure. The visualization 735 can be displayed, for example, on the display 106 of computing device 100 described in connection with FIG. 1. The visualization 735 illustrated in FIG. 7 includes a supply pump 736 and an AHU 738. In contrast with the example discussed below in connection with FIG. 8, for instance, the supply pump 736 and the AHU 738 illustrated in FIG. 7 are not overlaid in the visualization.

In some embodiments, a bounding box associated with output handlers can be determined. For instance, as shown in FIG. 7, the supply pump 736 includes two output handlers. A bounding box 760 can be a rectangle containing the two output handlers (e.g., a smallest rectangle containing the output handlers). In some embodiments, a bounding box associated with input handlers can be determined. For instance, as shown in FIG. 7, the AHU 738 includes two input handlers. A bounding box 762 can be a rectangle containing the two input handlers (e.g., a smallest rectangle containing the input handlers).

In some embodiments, a point of the output bounding box 760 and a point of the input bounding box 762 nearest each other can be determined. Stated another way, a particular corner 764 of the output bounding box 760 can be selected from a plurality of corners of the output bounding box 760 and a particular corner 766 of the of the input bounding box 762 can be selected from a plurality of corners of the input bounding box 762 responsive to a determination that a distance between the corner 764 of the output bounding box 760 and the corner 766 of the input bounding box 762 is below a threshold distance. A point between the point 764 and the point 766—a control (e.g., center) point 768—can be determined.

Figure 8:
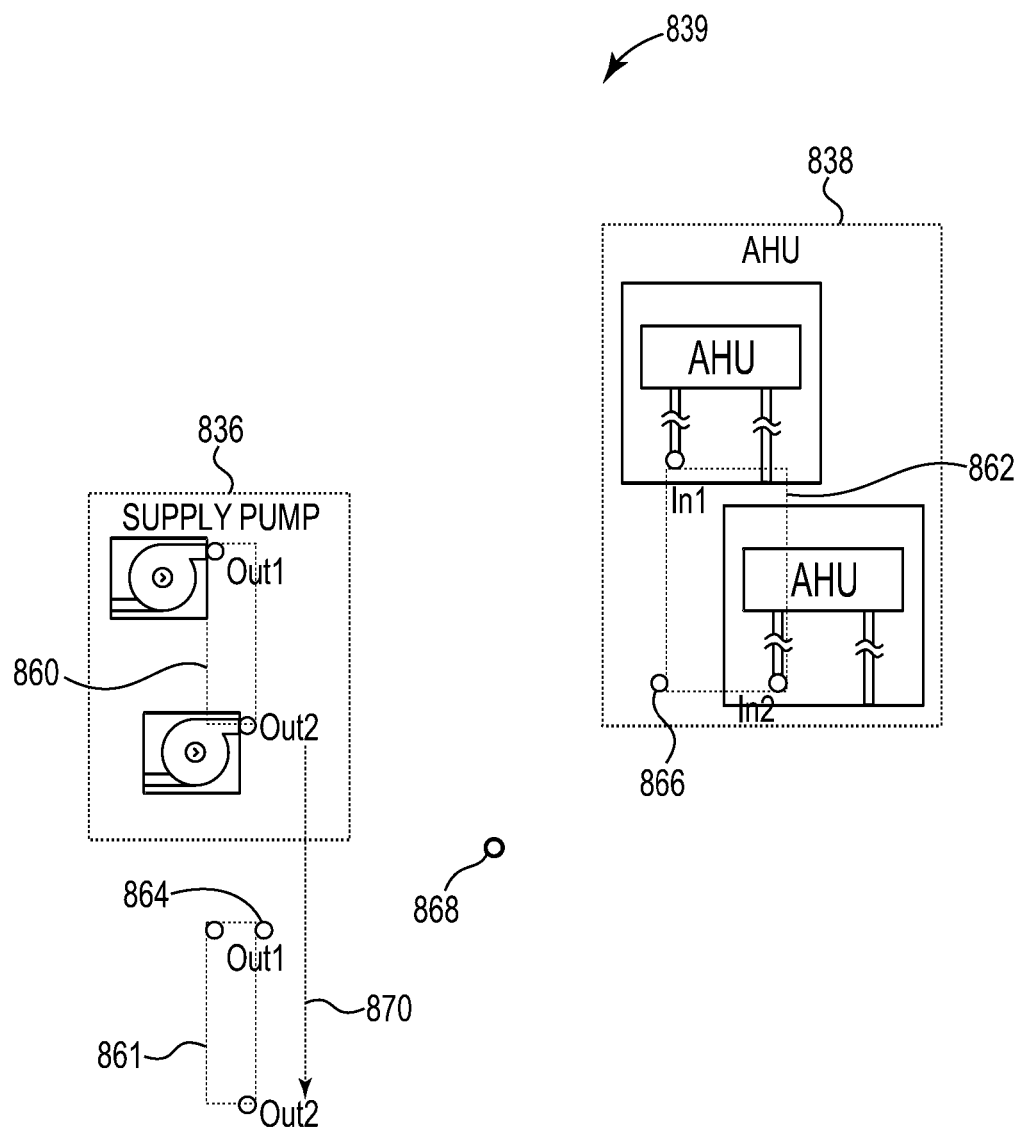
FIG. 8 illustrates another visualization associated with determining a control point in accordance with one or more embodiments of the present disclosure.

FIG. 8 illustrates another visualization associated with determining a control point in accordance with one or more embodiments of the present disclosure. The visualization 839 can be displayed, for example, on the display 106 of computing device 100 described in connection with FIG. 1. The visualization 839 illustrated in FIG. 8 includes a supply pump 836 and an AHU 838. In contrast with the example discussed above in connection with FIG. 7, for instance, the supply pump 836 and the AHU 838 illustrated in FIG. 8 are overlaid in the visualization. An overlay, as referred to herein, is a horizontal and/or vertical alignment of two or more models in a visualization that exceeds a particular threshold. An overlay may be undesirable in the visualization because relationships between those models may not be readily apparent or understood. Embodiments herein can utilize an offset in such instances.

As previously discussed, a bounding box associated with output handlers can be determined. For instance, as shown in FIG. 8, the supply pump 836 includes two output handlers. A bounding box 860 can be a rectangle containing the two output handlers (e.g., a smallest rectangle containing the output handlers). In some embodiments, a bounding box associated with input handlers can be determined. For instance, as shown in FIG. 8, the AHU 838 includes two input handlers. A bounding box 862 can be a rectangle containing the two input handlers (e.g., a smallest rectangle containing the input handlers).

In some embodiments, an offset 870 can be determined responsive to a determination that one of the output and input bounding boxes overlays the other of the output and input bounding boxes. For example, a minimum offset can be determined according to orientations of input handlers and/or output handlers, and/or bounding boxes of the input handlers and/or output handlers. Accordingly, the offset 870 renders the bounding box 860 repositioned to a new location in the visualization, shown in FIG. 8 as offset output bounding box 861.

In some embodiments, a point of the offset output bounding box 861 and a point of the input bounding box 862 nearest each other can be determined. For instance, a particular corner 864 of the offset output bounding box 861 can be selected from a plurality of corners of the offset output bounding box 861 and a particular corner 866 of the of the input bounding box 862 can be selected from a plurality of corners of the input bounding box 862 responsive to a determination that a distance between the corner 864 of the offset output bounding box 861 and the corner 866 of the input bounding box 862 is below a threshold distance. A point between the point 864 and the point 866 (e.g., a control point 868) can be determined.

Figure 9:
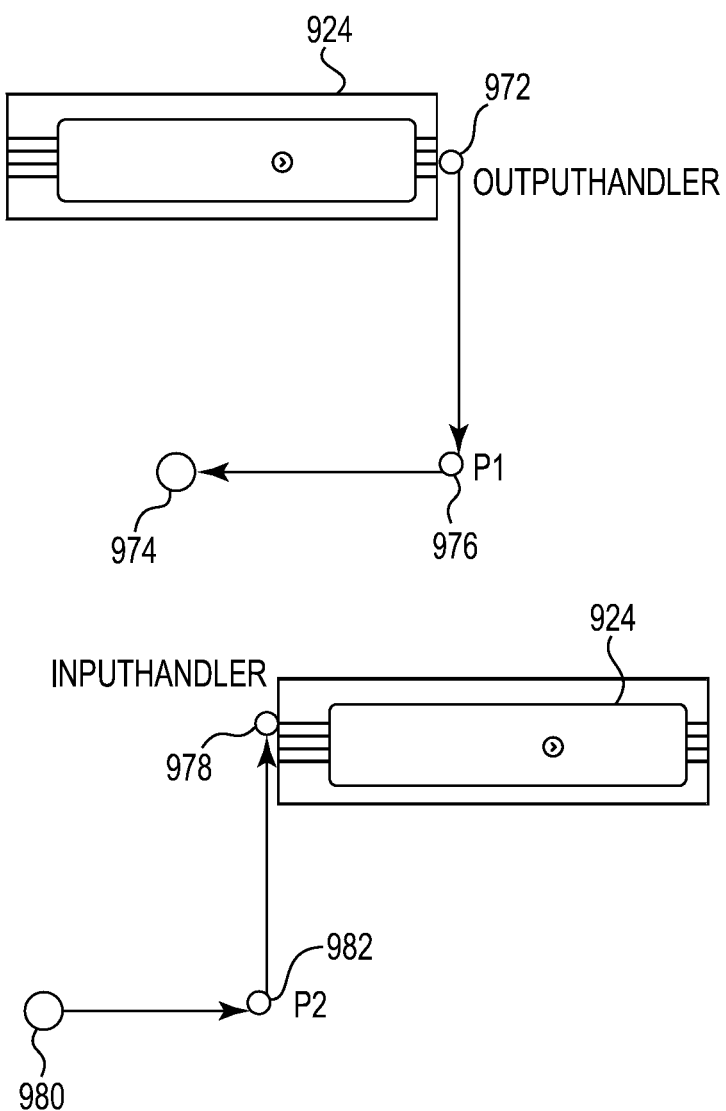
FIG. 9 illustrates visualizations associated with determining relationships between models of devices in accordance with one or more embodiments of the present disclosure.

Determining the line(s) to include in the visualization to represent the relationship(s) between devices can include determining and displaying a connection between the devices via a line between the devices that passes through the control point and includes at least one inflection point. FIG. 9 illustrates visualizations associated with determining relationships between models of devices in accordance with one or more embodiments of the present disclosure. As shown in FIG. 9, a chiller 924 includes an output handler 972 and an input handler 978. In the upper portion of FIG. 9, a path from the output handler 972 to a first control point 974 is shown. Along the path, embodiments herein can insert a first inflection point 976. Inflection points in accordance with embodiments of the present disclosure can be included to provide enhanced visualization (e.g., separate lines from one another and/or prevent lines from crossing over devices).

The determination of the path of the line from the output handler 972 to the first control point 974 can be determined, for instance, by:

```
If (OutputHandler.Orientation == RIGHT && Controlpoint.x >
OutputHandler.x) || (OutputHandler.Orientation == LEFT&&
Controlpoint.x < OutputHandler.x) then
    Begin
        var p1 = (Controlpoint.x, OutputHandler.y)
    End
    If (OutputHandler.Orientation == RIGHT && Controlpoint.x <
OutputHandler.x) || (OutputHandler.Orientation == LEFT&&
Controlpoint.x >OutputHandler.x) then
    Begin
        var p1 = (OutputHandler.x, Controlpoint.y)
    End
    Else
    Begin
        var p1 = (ControlPoint.x, OutputHandler.y);
    end
```

In the lower portion of FIG. 9, a path from the input handler 978 to a second control point 980 is shown. Along the path, embodiments herein can insert a second inflection point 982.

The determination of the path of the line from the input handler 978 to the second control point 980 can be determined, for instance, by:

```
If (InputHandler.Orientation == RIGHT && Controlpoint.x >
InputHandler.x) || (InputHandler.Orientation == LEFT&&
Controlpoint.x < InputHandler.x) then
    Begin
        var p2 = (Controlpoint.x, InputHandler.y)
    End
    If (InputHandler.Orientation == RIGHT && Controlpoint.x <
InputHandler.x) || (InputHandler.Orientation == LEFT&&
Controlpoint.x >InputHandler.x) then
    Begin
        var p2 = (InputHandler.x, Controlpoint.y)
    End
    Else
    Begin
        var p2 = (ControlPoint.x, InputHandler.y);
    end
```

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for building automation system visualizations from ontology, comprising:
  a display;
  a processing resource; and
  a memory having instructions stored thereon which, when executed by the processing resource, cause the processing resource to:
    determine a respective model associated with each of a plurality of devices of a Building Automation System (BAS), wherein each respective model includes an input handler and an output handler associated with its respective device;
    display, via the display, a visualization of the plurality of models and connections between the plurality of models, wherein the visualization is created from a template having a particular ontology corresponding to the BAS;
    determine a first bounding box associated with at least two output handlers of first one of the plurality of models, a second bounding box associated with at least two input handlers of a second one of the plurality of models, and a center point associated with the first model and the second model based on a corner of the first bounding box and a corner of the second bounding box;
    receive operating information associated with the BAS from at least one of the plurality of devices; and
    modify the visualization based on the received operating information.

2. The computing device of claim 1, wherein the visualization is a schematic visualization.

3. The computing device of claim 1, wherein the models include a respective model associated with:
  a chiller;
  an air handling unit;
  a boiler;
  a variable air volume device;
  a fan coil unit; and
  a pump.

4. The computing device of claim 1, including instructions to:
  receive additional operating information from the at least one of the plurality of devices after the visualization has been modified; and
  update the modified visualization based on the additional received operating information.

5. The computing device of claim 1, including instructions to determine, for each respective model:
  a position of the model in the visualization;
  a width of the model in the visualization; and
  a height of the model in the visualization.

6. The computing device of claim 1, including instructions to display the connections between the plurality of models as lines connecting the input handlers of each respective model to the output handlers of each respective model.

7. The computing device of claim 1, including instructions to select the corner of the first bounding box from a plurality of corners of the first bounding box and select the corner of the second bounding box from a plurality of corners of the second bounding box responsive to a determination that a distance between the corner of the first bounding box and the corner of the second bounding box is below a threshold distance.

8. The computing device of claim 1, including instructions to offset one of the first bounding box and the second bounding box responsive to a determination that one of the first and second bounding boxes overlays the other of the first and second bounding boxes.

9. The computing device of claim 1, including instructions to display a connection between the first model and the second model via a line between the first model and the second model that passes through the center point and includes at least one inflection point.

10. A method for building automation system visualizations from ontology, comprising:
  determining a respective model associated with each of a plurality of devices of a Building Automation System (BAS), wherein each respective model includes an input handler and an output handler associated with its respective device;
  displaying, via a display device, a visualization of the plurality of models and connections between the plurality of models, wherein the visualization is created from a template having a particular ontology corresponding to the BAS;
  determining a first bounding box associated with at least two output handlers of a first one of the plurality of models;
  determining a second bounding box associated with at least two input handlers of a second one of the plurality of models;
  determining a center point associated with the first model and the second model based on a corner of the first bounding box and a corner of the second bounding box;
  receiving operating information associated with the BAS from at least one of the plurality of devices; and
  modifying the visualization based on the received operating information.

11. The method of claim 10, wherein the method includes:
  receiving additional operating information from the at least one of the plurality of devices subsequent to the visualization being modified; and
  updating the modified visualization based on the additional received operating information.

12. The method of claim 10, wherein the method includes:
  determining a position of each respective model in the visualization;
  determining a width of each respective model in the visualization; and
  determining a height of each respective model in the visualization.

13. The method of claim 10, wherein the method includes displaying lines connecting the input handlers of each respective model to the output handlers of each respective model.

14. The method of claim 10, wherein the method includes selecting the corner of the first bounding box from a plurality of corners of the first bounding box and selecting the corner of the second bounding box from a plurality of corners of the second bounding box responsive to a determination that a distance between the corner of the first bounding box and the corner of the second bounding box is below a threshold distance.

15. The computing device of claim 10, wherein the method includes offsetting one of the first bounding box and the second bounding box responsive to a determination that one of the first and second bounding boxes overlays the other of the first and second bounding boxes.

16. The computing device of claim 10, wherein the method includes displaying a connection between the first model and the second model via a line between the first model and the second model that passes through the center point and includes at least one inflection point.

17. A non-transitory machine-readable medium having instructions stored thereon which, when executed by a processor, cause the processor to:
   determine a respective model associated with each of a plurality of devices of a Building Automation System (BAS), wherein each respective model includes an input handler and an output handler associated with its respective device;
   determine a first bounding box associated with at least two output handlers of a first one of the plurality of models;
   determine a second bounding box associated with at least two input handlers of a second one of the plurality of models;
   display, via the display, a visualization of the plurality of models and connections between the plurality of models, wherein the visualization is created from a template having a particular ontology corresponding to the BAS;
   offset, in the display, one of the first bounding box and the second bounding box responsive to a determination that one of the first and second bounding boxes overlays the other of the first and second bounding boxes;
   receive operating information associated with the BAS from at least one of the plurality of devices; and
   modify the visualization based on the received operating information.

18. The medium of claim 17, including instructions to:
   determine a center point associated with the first model and the second model based on a corner of the first bounding box and a corner of the second bounding box; and
   display a connection between the first model and the second model via a line between the first model and the second model that passes through the center point and includes at least one inflection point.

* * * * *